CIRCUIT ARRANGEMENT FOR MODIFYING BIT SEQUENCES IN ACCORDANCE WITH CERTAIN CHARACTERISTIC PROPERTIES THEREOF

Filed Sept. 10, 1962 3 Sheets-Sheet 1

INVENTOR
Günter Hotz

BY *Spencer & Kaye*
ATTORNEYS

INVENTOR
Günter Hotz

BY Spencer & Kaye
ATTORNEYS

INVENTOR
Günter Hotz

BY *Spencer & Kaye*
ATTORNEYS

United States Patent Office 3,259,882
Patented July 5, 1966

3,259,882

CIRCUIT ARRANGEMENT FOR MODIFYING BIT SEQUENCES IN ACCORDANCE WITH CERTAIN CHARACTERISTIC PROPERTIES THEREOF

Günter Hotz, Konstanz, Germany, assignor to Telefunken Patentverwertungs-G.m.b.H., Ulm (Danube), Germany Filed Sept. 10, 1962, Ser. No. 222,462
Claims priority, application Germany, Sept. 8, 1961, T 20,727
14 Claims. (Cl. 340—146.1)

The present invention relates generally to logical circuits for data processing units and the like, and, more particularly, to the transmission and regeneration of a sequence of bits of information with the use of threshold elements, for use in providing corrections in information and the like.

In recent years, numerous applications have become known for the use of threshold elements, particularly in the data processing field. These threshold elements are passive logical elements which are activated if a predetermined number of inputs are activated. This number is less than the total number of inputs and provides what may be called the "threshold value." The threshold value is not dependent upon the particular inputs which are activated, but only upon the total number thereof. The special case of the conjunction (AND) function wherein the threshold value equals the number of all of the inputs which are present, and the disjunctive (OR) function wherein the threshold value is one, are excluded from this consideration and are not included in the use of this term in the present disclosure.

By using these threshold elements, many logical circuits may be constructed in a simpler manner than heretofore possible. For example, it is known to provide filters constructed of these elements and which are capable of recognizing or suppressing certain characteristic properties of binary information sequences. Each of the input binary digits is directly fed to a threshold element and is also fed to at least one further threshold element, these latter being directly assigned to adjacent binary digits. Then, under certain conditions, the charcateristic feature can be made to appear at the outputs of the threshold elements.

In order to improve this effect, it is known to feed the output combination through the same filter several times, or to construct the thresholds to be adjustable for optimum recognition of the correct combinations. These known arrangements relate to an input combination which is present at a particular instant or to the parallel transfer of information.

With these features of the prior art in mind, it is a main object of the present invention to provide for the handling of an input sequence of binary digits which appears at a single input line or for the serial transfer of information.

Another object of the present invention is to provide a circuit arrangement including threshold elements which is so constructed as to correct sequences of serially fed information.

These objects and others ancillary thereto are accomplished according to preferred embodiments of the invention wherein a sequence of information in binary form is fed to a shift register which is constructed of a chain of bistable elements and the information outputs of which are connected to the inputs of one or more threshold elements. This connection is provided in such a manner that one threshold element is always connected with several bistable elements which are directly adjacent one another, and in this manner the threshold elements are included in a logical network predominantly constructed of threshold elements. The only output of such a network delivers an output sequence of binary information which essentially corresponds to the sequence which had been applied to the input but which has been with a great degree of probability, freed of errors of a preselected type.

The logical network may include several stages of threshold elements and each subsequent stage is provided with less elements than the preceding stage until the last stage comprises but a single element.

In accordance with a further feature of the invention, the input sequence is fed to a shift register which includes only a few bistable elements. The outputs of the elements are effective on only a single threshold element. The output of the single threshold element is, in turn, connected with a further smaller shift register having a threshold element connected in series therewith. This arrangement provides a particularly simple device for correcting single faulty binary digits when the actual information sequence is to comprise larger blocks of logic ONE or logic ZERO information.

A further feature of the invention provides feedback lines from outputs to threshold inputs of various stages, as well as coupling arrangements which permit an even better correction.

Additional objects and advantages of the present invention will become apparent upon consideration of the following description when taken in conjunction with the accompanying drawings in which.

Figure 1:
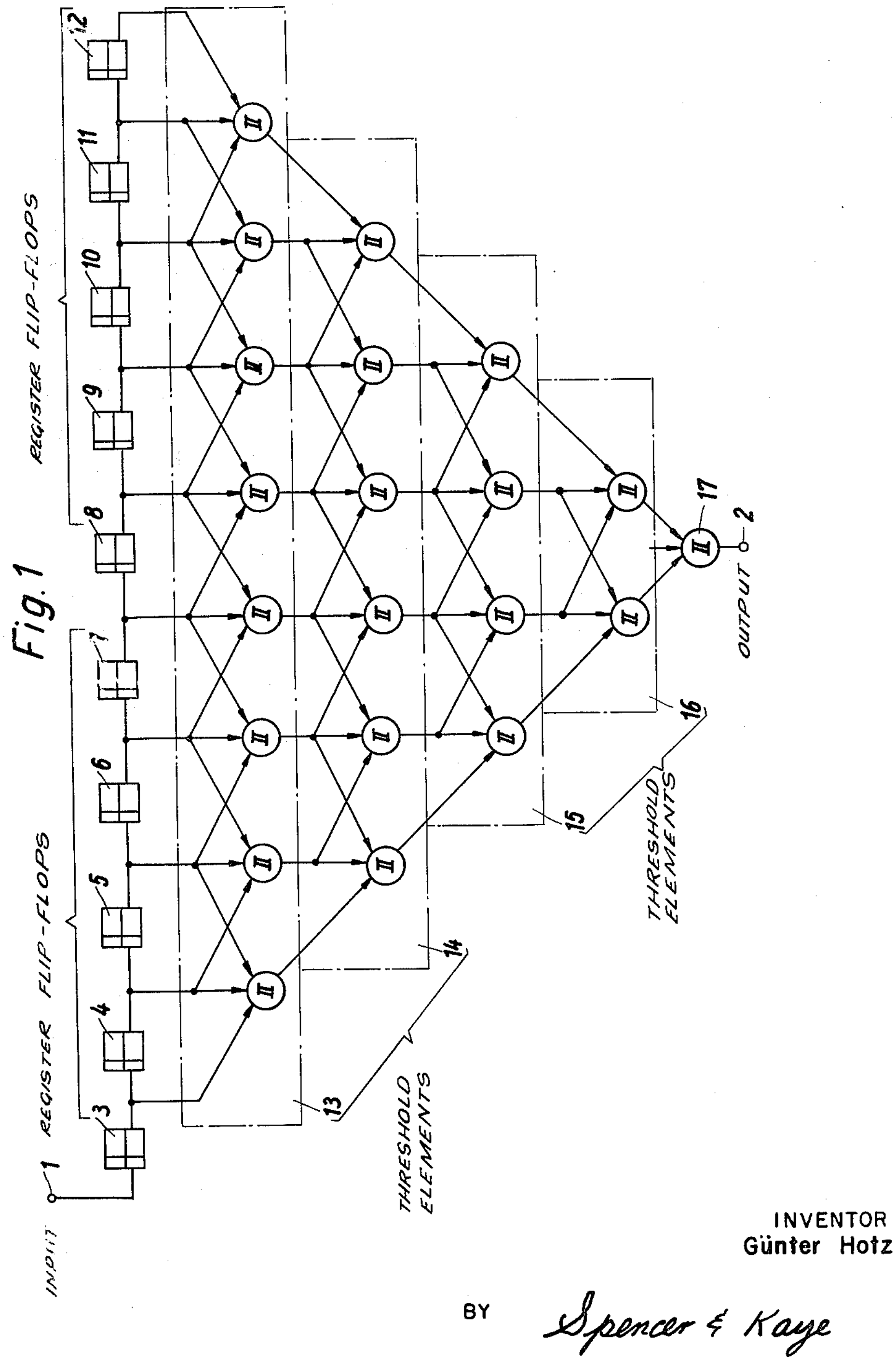
FIGURE 1 is a block diagram of one embodiment of the invention wherein a plurality of stages are included, each having one less number of threshold elements than the preceding stage.

With more particular reference to the drawings, FIGURE 1 illustrates a transfer device which is provided with an input 1 and an output 2. This device includes a shift register which is comprised of a plurality of bistable elements such as flip-flops 3 through 12 which are connected in series and may be of the type described in the Druker et al. Patent No. 2,967,250, issued January 3, 1961. The first member 3 of this shift register is directly connected with the input 1. Shift registers of this type are known per se and operate so that each newly arriving binary digit shifts the other digits, already in the register, by one position so that all the information which is in the register is, in the present example, shifted by one position to the right. When a binary digit reaches the last flip-flop 12 it will be removed from the register upon the next shift.

In accordance with the prior art, when binary digits have reached the flip-flop 12, the entire digit sequence may be corrected at the same time by using the known filters of the type mentioned above, and then this sequence is fed to a new register in parallel and is transferred through this new register. However, such an arrangement requires the use of two shift registers and cannot be operated continuously. Accordingly, processing speed is correspondingly decreased.

However, in contrast to this, and in accordance with the present invention, a filter pyramid is constructed of the known threshold elements which, for example, is provided with a first stage 13 including eight elements, a second stage 14 having six elements, a third stage 15 having four elements, a fourth stage 16 having two elements, and a last stage 17 which has but one element. All of these elements may be of the same type, and in the present illustration they will be considered to be of the type having a threshold value two and including a total of three inputs. The threshold values are indicated in the drawings by Roman numerals. Except for the last element 17, each of the elements is connected with the outputs of three adjacent elements from a preceding stage. The element 17 is connected with the outputs of the two elements of the preceding stage, and its third input is not connected to any other element and is thus free and is never activated. Accordingly, this element 17 operates in the same fashion as a normal AND-circuit. The output of this element 17 provides the only output of the logical network.

The arrangement illustrated in FIGURE 1 operates by providing signals at the output when a block of information of binary ONE digits is placed into the shift register. This block of information will appear at the output after the first ONE has reached the flop-flop 8. If a purely alternate sequence of ZERO and ONE is present at the input, then only ZERO will appear at the output. Similarly, single ONES and ZEROS are suppressed.

The network is therefore capable of regenerating signal sequences which in their corect condition comprise blocks of ONE or ZERO bits of information and which, during transfer or transmission of information, were subjected to certain types of disturbances or interferences which were superimposed onto the train of information during the course of transmission or transfer, and this is particularly true of isolated single errors. The type or arrangement of the threshold value elements of the individual stages and the chains formed by connection with similar elements must be adjusted to the type of signals which are to be expected as well as to the character of the possible errors which may occur. In the present example under consideration, in order for there to be proper recognition and correction of an entire block of ONE bits of information, it is sufficient if at least every other digit is free of errors and if, in addition, at an interval having a maximum of five digits, there are two adjacent digits which have been transferred or transmitted correctly without error. However, this will not hold for the conditions at the beginning and end of the block of information, but this will be discussed in further detail below. If double errors occur, that is, errors in adjacent blocks or digits, they are not corrected with the above-described arrangement. However, such errors may be suppressed, for example, by using filters constructed to have threshold elements with five inputs and a threshold value of three.

Figure 2:
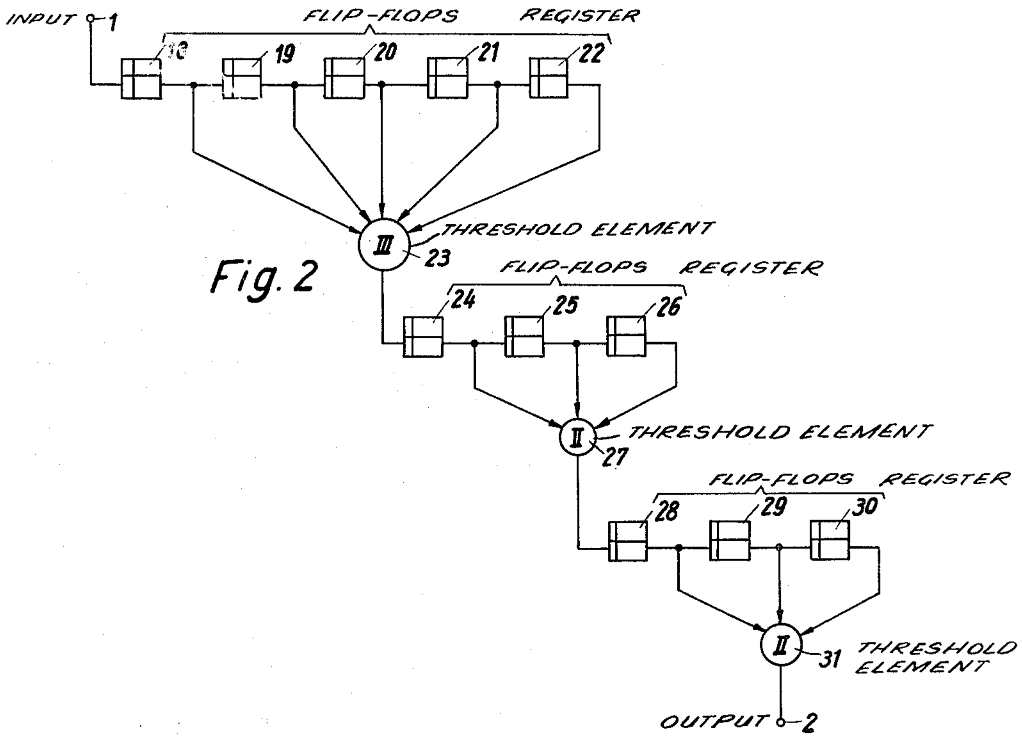
FIGURE 2 is a block diagram of an arrangement wherein three shift registers are used.

With more particular reference to FIGURE 2, a modified embodiment of the present invention is illustrated. Flip-flops 18 through 22 of a shift register are provided, and the sequence to be corrected is applied to this register at the input 1. The outputs of the five flip-flops are connected with five inputs of a threshold element 23 having a threshold value of three. The output of threshold element 23 is effective upon the input of a further shift register which includes three flip-flops, 24, 25, and 26. The outputs of these latter flip-flops are in turn connected with a threshold element 27 having three inputs and a threshold value of two. In order to improve this correction process a still further shift register is connected in series therewith and has the three flip-flops 28, 29, and 30, which are effective upon a threshold element 31 having three inputs and a threshold value of two.

This arrangement provides good corrections similar to those which are provided by means of the first-mentioned pyramid example of FIGURE 1, and with an essential saving in threshold elements. However, no optimum arrangement can be provided for in general; but rather, the frequency with which errors occur and the construction or arrangement of the correct sequence, result in various combinations of shift registers and threshold elements for particular cases.

In order to more clearly demonstrate the mode of operation of the present invention, the output succession which occurs at the output of a network similar to FIGURE 1 is shown in Table 1 of the appendix. Table 1 illustrates the output which occurs for a certain input sucession of O and L values wherein L denotes a logic ONE. The succession has been calculated for a network having one less bistable element and therefore ends in stage 16 with a single threshold element rather than having an additional element 17. However, the table serves to demonstrate how the invention operates. For the same input succession the output succession has also been provided in connection with a network according to FIGURE 2 and the results are shown in the table. In the individual lines regarding FIGURE 1, the output successions are illustrated which are obtained in a chronologically displaced manner at a threshold element of the stage 13, 14, 15 or 16. In this arrangement all of the threshold elements have a threshold value of 2 and they have three inputs and an L is obtained in those cases where at least two of the three members positioned symmetrically immediately thereabove are equal to L. In the example of FIGURE 2 which is provided for the same input succession an L is provided at the output succession of stage 23 if, of the five members of the input succession positioned symmetrically thereabove, at least three of these are equal to L. The reason for this is that this stage has a threshold element with five inputs and a threshold value of three. The outputs of stages 27 and 31 are also shown.

It can be seen that the two embodiments according to FIGURES 1 and 2 have different output successions. In FIGURE 1 if two zeros follow each other in the input succession, these zeroes will also always occur in the output succession. In FIGURE 2, two neighboring zeros are additionally corrected as errors if in the general region of the input succession, the L's are a preponderance. An OLOL is converted to a pure zero succession if it is encompassed by zeros and it is converted to an L succession if it is bounded by LL on at least one side. Thus, by means of different combinations of elements in accordance with the present invention, and only a few of which are shown in the drawings, quite different conversions can be obtained in accordance with the needs of the system.

Figure 3:
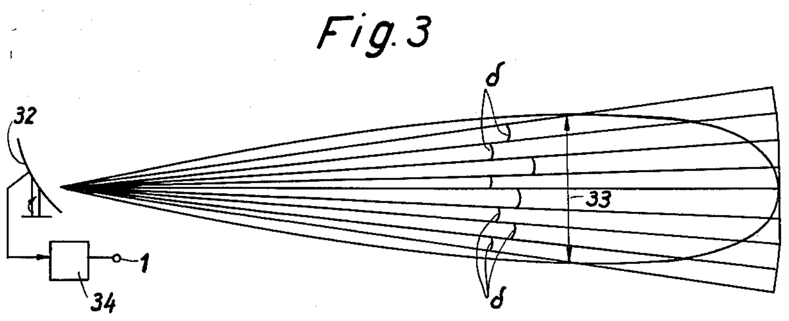
FIGURE 3 is a diagrammatic view of an arrangement illustrating the utility of the present invention in connection with radar.

Using the examples mentioned above, target information of a radar picture in digital form can successfully be freed from noise. Such an application for the present invention is diagrammatically illustrated in FIGURE 3. A rotatable radar antenna 32 is illustrated which transmits radar signals at regular, spaced intervals, for example, at those intervals which are provided when the antenna is rotated by an angle $\delta$. The angle in relation to the breadth 33 of the lobe of the transmitted signal or radiation pattern is such that, from each target location, several target pulses are reflected back to the receiving antenna, for example, ten such pulses. Therefore, a target is never indicated by a single pulse and by a single binary ONE, but, after conversion in the digital device 34, is rather always indicated by a block or series of ONES. The center of the block indicates the accurate target location. However, since much noise is generally ambient in the reflected radar signal from the target, gaps will appear in the target block of digital information which would be incorrectly interpreted when the target location is being determined. The arrangements set forth above eliminate these errors in a short amount of time, with relatively little expenditure with respect to space and money, and with a clear and logical construction.

Figure 4:
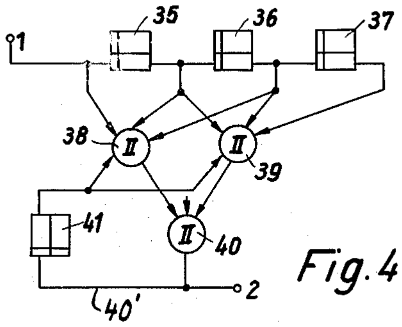
FIGURE 4 is a block diagram of a simple arrangement illustrating a simple delay feedback arrangement with a single shift register.

The correcting process may be improved by providing feedback lines, and such lines are included in the embodiments which will be described below. With more particular reference to FIGURE 4, a three-position or three-digit shift register is illustrated which includes flip-flops 35, 36, and 37. The connecting lines of this shift register are connected in a suitable arrangement as shown, with two threshold elements 38 and 39 having a threshold value of two and which are, in turn, connected to a threshold element 40. The output of the threshold element 40 provides the only output 2 of the filter pyramid and also provides the feeding point of a feedback branch 40', which is provided with a delay member 41, such as described in the book "Digital Computer Components and Circuits" by Richards, published by Van Nostrand in 1957 on page 101, FIG. 3–15, or of the flip-flop with delayed input type as described in the Druker et al. Patent No. 2,967,250, issued January 3, 1961, and is connected to one input of each of the threshold elements 38 and 39, respectively.

The operation of this arrangement is such that if several ONE digits arrive at the input 1 successively, and therefore a ONE is also present a number of times at the output, in effect the thresholds of the elements 38 and 39 are lowered by means of this feedback so that a single ONE input will surpass the threshold. Such an arrangement is suitable for the correction of "crumbling" blocks, since, if a block of ONES is not present at the input, this circuit will act in the same manner as a circuit which does not contain the feedback arrangement. However, if, at the end of a block of ONES, a single ONE between two ZEROS is provided, this is sufficient so that this ONE will also be counted as pertaining to the same block. If this is considered in the light of the radar example mentioned above, a single ONE which follows a block of ONES and which probably belongs to the block, will actually be handled as though it were part of the block and will be counted therewith by changing the ZERO disposed therebetween to ONE.

Figure 5:
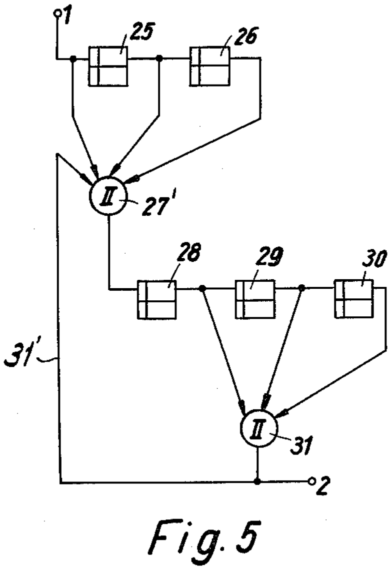
FIGURE 5 is a block diagram of two shift registers using a feedback line, but without a delay.

FIGURE 5 illustrates an arrangement which is similar to that of FIGURE 2 except for the fact that a feedback line 31' is provided. Since the elements which form the embodiment of FIGURE 5 are similar to that of FIGURE 2, they are indicated with similar reference numerals except that element 27 of FIGURE 2 which was provided with only three inputs, is identified as 27' in FIGURE 5, and it now has four inputs including the input of the feedback line 31'. The feedback 31' between the output 2 and an input of threshold element 27' is effective as a means for regenerating the end of a block of ONES in a manner similar to the feedback of the embodiment of FIGURE 4.

Figure 6:
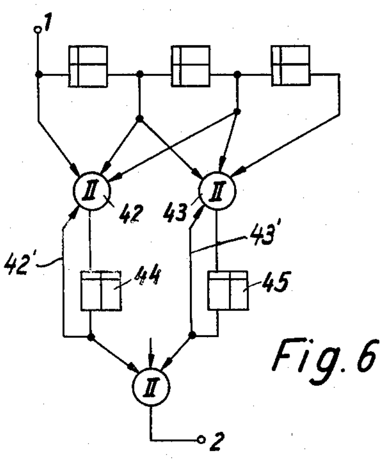
FIGURE 6 is a block diagram of a logical circuit using feedback which is provided to the input of the same stage from which the feedback is originated.

Another embodiment is illustrated in FIGURE 6 wherein the same effect can also be obtained by providing feedback in a logical network. In this embodiment two elements 42 and 43 of a first stage of a two stage network are each provided with a feedback line 42' and 43', respectively. The lines include delay members 44 and 45 and each line is fed back to its corresponding threshold element.

Figure 7:
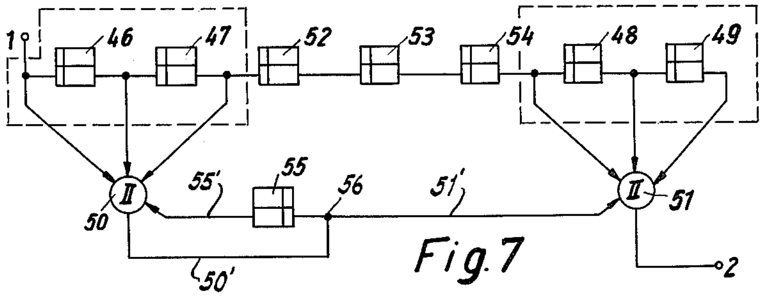
FIGURE 7 is a block diagram of an arrangement wherein correction is provided both at the beginning and at the end of a sequence of digits.

The circuits described above have either a uniform capability of correction, that is, without feedback, or an increased capability of correction, at the end of a block of ONES. In FIGURE 7, however, an arrangement is illustrated wherein the threshold is lowered at the beginning of the block, too. The advantage of such an arrangement is that the center of a block, and thus the approximate location of a target remain the same before and after regeneration. On the other hand, if the correction process is carried out with preference to one side, the center of the block shifts.

The arrangement shown in FIGURE 7 includes two shift registers which are provided by the flip-flops 46, 47 and 48, 49, respectively. Each shift register is connected to one threshold element 50 and 51, respectively, each of which has a threshold value of two. The first shift register 46, 47 is directly connected with the input 1 while the single output 2 of the circuit is provided at the output of the second threshold element 51. The two shift registers are fed with the same information sequence. However, there is a time delay which is provided by means of three delay members or flip-flops 52, 53, and 54, which are connected between the last flip-flop 47 of the first shift register and the first flip-flop 48 of the second register. If the feedback were not used, the outputs of elements 50 and 51 would each deliver a uniformly corrected sequence which is shifted in relationship to the other with respect to time.

Feedback is provided by connecting the output line 50' of threshold element 50 to a connection point 56 which feeds this output to the input line 51' of the second threshold element 51 and also to a feedback line 55' which includes delay member 55 and is an input to element 50.

By means of this feedback arrangement, the earlier sequence, which is the output from element 50, effectively lowers the threshold of element 51 shortly before a block of ONES appears at this element. At the same time, this earlier sequence is also applied back to element 50 by means of the delay member 55, and this results in an improved correction at the end of a block.

As indicated by the above-described examples and embodiments, a great number of advantageous arrangements for the correction of a series or sequence of digital information can be provided from a combination of shift registers and threshold elements and these arrangements may be provided with different properties in dependance upon the correction requirements which are desired.

In this connection a register which receives the information sequence in parallel and shifts it several times by one binary digit, can be used as a shift register. In this manner, several sequences which are provided one within the other or intermingled together, can be regenerated in such a manner that one of the sequences does not influence the correction of the other sequences. The present invention may also be used in those cases where a particular switching circuit system does not permit miltistage series connections of threshold elements. In such cases a flip-flop stage is connected between each stage of elements and the flip-flop stage only delays the output sequence.

Also, the present invention is not limited to these modes of application, but can be used in any case in which single errors in known pulse sequences are to be corrected. If the correct or error-free pulse sequence is composed of a ZERO/ONE alternate sequence or of another cyclic sequence, individual flip-flop outputs may be connected with the inputs of threshold elements by means of circuits having a negating function. For example, an indication as to the beginning or end of a longer block of ONES is obtained at the output of a one-stage filter whose first or last flip-flops are connected with the threshold element by means of circuits having a negating function, if the threshold value is higher than the number of inputs which are not negated.

Another feature which improves the arrangement of the present invention is accomplished by using elements having an adjustable threshold value instead of elements having fixed predetermined threshold values. Elements of this type are disclosed, for example in the pending U.S. patent application of Erhard Czok et al., filed December 11, 1961, Serial No. 158,436. Depending upon the frequency or errors of the sequence to be corrected, for example in the case of radio weather changes, the thresholds of individual element or of all of the elements may be set in such a manner that an optimum relationship is provided between the suppression of noise and target resolution.

It will be understood that the above description of the present invention is susceptible to various modifications, changes, and adaptations, and the same are intended to be comprehended within the meaning and range of equivalents of the appended claims.

FOR FIG. 1

| | |
|---|---|
| Input Succession | O O O L L L O O L L O L O O O L L O O L L O O L O L O L L O L O L O L L O O O L O L O L O L O O |
| Stage 13 | O O O L L L O O L L L O O O O L L O O L L O O O L O L L L L O L O L L L O O O O L O L O L O O O |
| Stage 14 | O O O L L L O O L L L O O O O L L O O L L O O O O L L L L L L O L L L L O O O O O L O L O O O O |
| Stage 15 | O O O L L L O O L L L O O O O L L O O L L O O O O L L L L L L L L L L L O O O O O O L O O O O O |
| Stage 16 | O O O L L L O O L L L O O O O L L O O L L O O O O L L L L L L L L L L L O O O O O O O O O O O O |

FOR FIG. 2

| | |
|---|---|
| Input Succession | O O O L L L O O L L O L O O O L L O O L L O O L O L O L L O L O L O L L O O O L O L O L O L O O |
| Stage 23 (III) | O O O L L L L L O L L O O O O O O L L O O L O O O L L L L L L O L L L O O O O O O L O L O O O O |
| Stage 27 (II) | O O O L L L L L L L L O O O O O O L L O O O O O O L L L L L L L L L L O O O O O O O L O O O O O |
| Stage 31 (II) | O O O L L L L L L L L O O O O O O L L O O O O O O L L L L L L L L L L O O O O O O O O O O O O O |

What is claimed is:

1. A circuit arrangement for modifying a series or sequence of bits of information so as to free said sequence from possible errors, the information content of which is contained in blocks including several successive symbols of binary digits comprising in combination: a shift register having an input and including a chain of bistable elements to which the sequence of binary digits is fed; and a logical network including at least one threshold element connected with the outputs of at least two consecutive bistable elements and for exciting its output when a predetermined number of its inputs, which is less than the total number of inputs, is excited, said logical network having a single output for delivering an output sequence of bits of information which corresponds essentially to the sequence initially applied to the register input and dependent upon the possible errors contained therein.

2. A circuit arrangement as defined in claim 1 wherein the outputs of said shift register elements are connected to a single threshold element, and further comprising a second shift register having its input connected with the output of said single threshold element, and a threshold element connected in series with said second shift register.

3. A circuit arrangement as defined in claim 1 wherein a plurality of threshold elements are provided and the logical network predominantly includes threshold elements.

4. A circuit arrangement as defined in claim 3 wherein the logical network includes several stages, each stage including a plurality of threshold elements with each successive stage having less threshold elements than the preceding stage, such stages being continuously connected with the last stage including but a single element.

5. A circuit arrangement as defined in claim 3 wherein the logical network includes several stages.

6. A circuit arrangement as defined in claim 5, comprising delay members disposed between two successive stages of threshold elements.

7. A circuit arrangement as defined in claim 5 wherein the output of at least one threshold element is connected with an input of a preceding stage.

8. A circuit arrangement as defined in claim 5, comprising at least one delay member connected with the output of at least one threshold element, and the output of said delay member being connected with the input of a threshold element of a preceding stage.

9. A circuit arrangement as defined in claim 8, comprising a second shift register and a second logical network including threshold elements connected in series with said shift registers, said registers being connected to receive the information sequence to be transmitted, but shifted with respect to time, and the outputs of the threshold elements of the first logical network which receives the information previously being effective upon the inputs of threshold elements of the second logical network.

10. A circuit arrangement as defined in claim 9 wherein the outputs of the threshold elements of the first logical network are connected to receive the previous information and are effective by means of delay elements upon inputs of threshold elements of the first and of the second logical network.

11. A circuit arrangement for modifying a succession of bits, disturbed by inversion of individual bits where the undisturbed information content of this bit succession, includes blocks of several bits or bit groups, into another and especially into the undisturbed succession, said arrangement, comprising, in combination: a shift register including a chain of bistable elements and having an input via which the bit succession is fed through the register; and at least one threshold element having several inputs and one output at which a signal significant of "L" appears when a predetermined number of inputs is excited which predetermined number is less than the total number of inputs and at which a signal significant of "O" otherwise appears, said inputs being connected with bistable elements which are adjacent one another, whereby the signals at the output form the modified bit succession corresponding to an undisturbed input bit succession.

12. An arrangement as defined in claim 11 wherein there are several threshold elements whose inputs are respectively connected to the outputs of bistable elements pertaining to different but partially overlapping portions of the shift register, the outputs of said threshold elements being connected to the input of an output threshold element.

13. An arrangement as defined in claim 12 wherein further threshold elements are interposed between the threshold element connected to said bistable elements and the output threshold element so that a multi-stage logic network is defined having a number of threshold elements which decreases per stage.

14. An arrangement as defined in claim 11 comprising a further shift register having its input connected to the output of said threshold element, and a further threshold element having its inputs connected to said further shift register.

References Cited by the Examiner

UNITED STATES PATENTS

| | | | |
|---|---|---|---|
| 2,942,193 | 6/1960 | Tryon | 340—146.1 X |
| 2,958,072 | 10/1960 | Battey | 340—146.1 |
| 3,016,517 | 1/1962 | Saltzberg | 340—146.1 |

MALCOLM A. MORRISON, *Primary Examiner.*

ROBERT C. BAILEY, *Examiner.*

E. M. RONEY, M. P. ALLEN, *Assistant Examiners.*